United States Patent
Kowalevicz et al.

(10) Patent No.: US 9,018,575 B2
(45) Date of Patent: Apr. 28, 2015

(54) NON-RETROREFLECTIVE OPTICAL THREAT DETECTION SYSTEM AND METHODS HAVING AN IMAGING DETECTOR ALIGNED WITH A TILTED IMAGE PLANE TO RECONSTRUCT AN IMAGE FROM PLURAL IMAGE SLICES

(71) Applicant: Raytheon Company, Waltham, MA (US)

(72) Inventors: Andrew Kowalevicz, Alexandria, VA (US); Frank Allen Birdsong, Jr., Alexandria, VA (US)

(73) Assignee: Raytheon Company, Waltham, MA (US)

( * ) Notice: Subject to any disclaimer, the term of this patent is extended or adjusted under 35 U.S.C. 154(b) by 207 days.

(21) Appl. No.: 13/714,637

(22) Filed: Dec. 14, 2012

(65) Prior Publication Data

US 2014/0166854 A1    Jun. 19, 2014

(51) Int. Cl.
| | |
|---|---|
| *H01L 27/00* | (2006.01) |
| *G01S 3/784* | (2006.01) |
| *F41G 3/14* | (2006.01) |
| *G01S 5/16* | (2006.01) |
| *G01S 7/48* | (2006.01) |
| *G02B 5/128* | (2006.01) |
| *H04N 5/00* | (2011.01) |

(52) U.S. Cl.
CPC . *G01S 3/784* (2013.01); *F41G 3/14* (2013.01); *G01S 5/16* (2013.01); *G01S 7/4804* (2013.01); *G02B 5/128* (2013.01); *H04N 5/00* (2013.01)

(58) Field of Classification Search
USPC ........... 250/221, 214.1, 216, 214 VT, 339.01, 250/339.06, 208.1; 345/87, 156–169
See application file for complete search history.

(56) References Cited

U.S. PATENT DOCUMENTS

| | | | |
|---|---|---|---|
| 4,836,672 | A | 6/1989 | Naiman et al. |
| 5,602,393 | A | 2/1997 | Gerard |
| 5,629,492 | A | 5/1997 | Gleason |
| 5,844,727 | A | 12/1998 | Partlo |
| 6,439,728 | B1 | 8/2002 | Copeland |
| 6,721,539 | B1 | 4/2004 | O'Brien et al. |
| 6,862,147 | B1 | 3/2005 | Sonstroem |
| 6,974,219 | B1 | 12/2005 | Geneczko et al. |

(Continued)

FOREIGN PATENT DOCUMENTS

| | | |
|---|---|---|
| WO | 2005082027 A2 | 9/2005 |
| WO | 2006078397 A2 | 7/2006 |
| WO | 2009151660 A2 | 12/2009 |

OTHER PUBLICATIONS

Chevalier, William J., "Assessment of Glint Hazard to Soldiers", U.S. Army Soldier and Biological Command, Dec. 1998.

(Continued)

*Primary Examiner* — Que T Le
(74) *Attorney, Agent, or Firm* — Lando & Anastasi, LLP

(57) ABSTRACT

Methods and apparatus for covert detection of an interrogating device. In one example a method includes receiving an interrogation beam at an optical system, imaging a scene including a source of the interrogation beam without retroreflecting the interrogation beam to produce an image, and analyzing the image to determine an approximate location of the source within the scene. In some examples, a threat detection sensor is used to further analyze the interrogation beam to determine information about the interrogating device.

19 Claims, 3 Drawing Sheets

(56) References Cited

U.S. PATENT DOCUMENTS

| | | | |
|---|---|---|---|
| 7,282,695 | B2 | 10/2007 | Weber et al. |
| 7,576,791 | B2 | 8/2009 | Sonstroem |
| 7,667,598 | B2 | 2/2010 | Yenisch et al. |
| 8,063,348 | B1 | 11/2011 | Swaminathan et al. |
| 8,217,354 | B2 * | 7/2012 | Chang .................. 250/339.06 |
| 8,228,582 | B1 | 7/2012 | Pepper et al. |
| RE43,681 | E | 9/2012 | Wild et al. |
| 8,508,474 | B2 * | 8/2013 | Machida et al. ............. 345/158 |
| 2006/0234191 | A1 | 10/2006 | Ludman |
| 2009/0237668 | A1 | 9/2009 | Reyes, Jr. et al. |
| 2010/0283848 | A1 | 11/2010 | Adler et al. |
| 2012/0200700 | A1 | 8/2012 | Bennett et al. |

OTHER PUBLICATIONS

Fulghum, David A., "Sensor Versus Sensor in Combat", http://www.aviationweek.com/aw/blogs/defense/index.jsp?plckController=Blog&plckScript=blogScript&plckElementId=blogDest&plckBlogPage=BlogViewPost&plckPostId=Blog:27ec4a53-dcc8-42d0-bd3a-01329aef79a7Post:6b5204db-3e13-4728-a30e-5408ef711e6e Jan. 7, 2010.

Mieremet, Arjan L. et al., "Retroreflection Reduction by Masking Apertures", Optical Engineering, Abstract Only, vol. 49, No. 4, Apr. 1, 2010.

US RE42,554, 07/2011, Wild et al. (withdrawn)

* cited by examiner

NON-RETROREFLECTIVE OPTICAL THREAT DETECTION SYSTEM AND METHODS HAVING AN IMAGING DETECTOR ALIGNED WITH A TILTED IMAGE PLANE TO RECONSTRUCT AN IMAGE FROM PLURAL IMAGE SLICES

BACKGROUND

Imaging and optical sensing devices are widely used in both commercial and military applications. In traditional configurations of focused optical imaging or sensing systems, a sensor array is located in the image plane and oriented perpendicular to the optical axis. This configuration is necessary to keep the image in focus across the entire active area of the imaging detector; however this configuration makes the system retro-reflective. As a result, any light not absorbed by the sensor (e.g., a camera or focal plane array sensor) is reflected and imaged directly back to the source along the same optical path as the incident light (i.e., retro-reflected).

Optical augmentation (OA) systems use this property of retro-reflection to detect hidden optical systems. For example, an OA interrogator uses an active light source to sweep through an environment illuminating any target optical devices, and retro-reflection leads the "cat's eye" effect, which allows any illuminated target optical systems to be identified, located and characterized. Even though the location of the interrogator may be easily determined, by the very fact that the target optical system observes the interrogation beam, its location is revealed. In addition, the OA system may determine some information about the technical specifications of the target optical system from the nature of the retro-reflections.

SUMMARY OF INVENTION

Aspects and embodiments are directed to providing the capability to continuously covertly determine location and identification information about an optical augmentation source without being detected. In addition, according to certain embodiments, this capability may be provided in an imaging system without compromising the imaging function(s), as discussed further below.

According to one embodiment, a non-retro-reflective optical threat detection system comprises a structured relay optic configured to receive electromagnetic radiation representing a source image volume, the electromagnetic radiation including an interrogation beam, the structured relay optic further configured to slice the source image volume into a plurality of image slices and to reimage the plurality of image slices onto a tilted image plane that is tilted relative to an optical axis of the non-retro-reflective optical threat detection system, an imaging detector aligned with the tilted image plane and configured to reconstruct a an image from the plurality of image slices, the image including an image of the interrogation beam, and to reflect the interrogation beam off-axis with respect to the optical axis of the non-retro-reflective optical threat detection system, and a processor coupled to the imaging detector and configured to process the image to determine an approximate location of a source of the interrogation beam within a field of view of the non-retro-reflective optical threat detection system.

In one example the structured relay optic is configured to spatially position the plurality of image slices such that a depth of focus of each image slice overlaps the tilted image plane. The imaging detector may be a focal plane array, for example. The non-retro-reflective optical threat detection system may further comprise a threat detection sensor positioned off-axis with respect to the optical axis of the non-retro-reflective optical threat detection system and configured to receive and analyze the interrogation beam. In one example the threat detection sensor is configured to determine a modulation format of the interrogation beam. In another example the threat detection sensor is configured to provide identifying information corresponding to the source of the interrogation beam based on the modulation format of the interrogation beam. The threat detection sensor may be further configured to determine a wavelength of the interrogation beam. In one example the threat detection sensor is configured to provide the identifying information based on the modulation format and the wavelength of the interrogation beam. The threat detection sensor may be configured to receive the interrogation beam reflected by the imaging detector.

According to another embodiment an optical threat detection system comprises a plurality of optical sensors each including a structured relay optic configured to receive electromagnetic radiation representing a source image volume, the electromagnetic radiation including an interrogation beam, the structured relay optic further configured to slice the source image volume into a plurality of image slices and to reimage the plurality of image slices onto a tilted image plane that is tilted relative to an optical axis of the optical sensor, an imaging detector aligned with the tilted image plane and configured to reconstruct an image from the plurality of image slices, the image including an image of the interrogation beam, and to reflect the interrogation beam off-axis with respect to the optical axis of the optical sensor system, and a processor configured to process the image to determine approximate location information about a source of the interrogation beam, wherein the processor of at least one of the plurality of optical sensors is configured to receive the approximate location information from others of the plurality of optical sensors and to determine a location of the source based on combined analysis of the approximate location information from the plurality of optical sensors.

In one example the plurality of optical sensors are communicatively coupled together to form a network of sensors. In another example each of the plurality of optical sensors further includes a threat detection sensor positioned off-axis with respect to the optical axis of the optical sensor and configured to receive and analyze the interrogation beam reflected from the imaging detector to determine identification information about the source. In another example the threat detection sensor is configured to determine at least one of a wavelength and a modulation format of the interrogation beam.

According to another embodiment, a method of covert detection of an interrogating device comprises receiving an interrogation beam at an optical system, imaging a scene including a source of the interrogation beam without retro-reflecting the interrogation beam to produce an image, and analyzing the image to determine an approximate location of the source within the scene.

In one example the method further comprises reflecting the interrogation beam off-axis to a threat detection sensor, and analyzing the reflected interrogation beam at the threat detection sensor to determine identification information about the source. Analyzing the reflected interrogation beam may include determining at least one of a wavelength and a modulation format of the interrogation beam. In one example imaging the scene without retro-reflecting the interrogation beam includes segmenting a source image volume of the scene into a plurality of image slices, each image slice having an image volume, individually reimaging the plurality of image slices onto a tilted image plane tilted with respect to an optical axis of the optical system such that the image volume of each image slice overlaps the tilted image plane, and reconstructing a substantially in-focus image at the tilted image plane from the plurality of image slices. The method may further comprise sharing the approximate location information among a plurality of optical systems. The method may further comprise collectively processing the approximate location information from the plurality of optical systems to obtain the location of the source of the interrogation beam.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to methods and apparatus that provide the capability to determine and track the location of an optical augmentation (OA) source, and also to provide some identifying information regarding the OA source, in a covert, undiscoverable way. In particular, aspects and embodiments use an imaging system that is configured to eliminate tell-tale retro-reflections, and thereby is able to observe OA interrogation beams without revealing its location through retro-reflection. As discussed in more detail below, the imaging system may be configured to implement "sliced source" imaging in which a structured relay optic segments or slices a source image and reimages the individual slices onto a tilted image plane such that the entire image is faithfully reconstructed. In this manner, a segmented image plane is achieved, tilted or rotated in angle with respect to the optical axis of the optical system. The tilted image plane results in the optical system being non-retro-reflective, while the segmentation of the image plane allows a substantially in-focus image to be maintained. As a result, the imaging system may receive and analyze an interrogation beam to obtain information about the OA source, as discussed in more detail below, without returning a retro-reflection to reveal its location and without disrupting any imaging functions. Embodiments or these imaging systems are referred to as "passive" since they need not emit any interrogation beams of their own to receive and analyze the OA interrogation beams.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
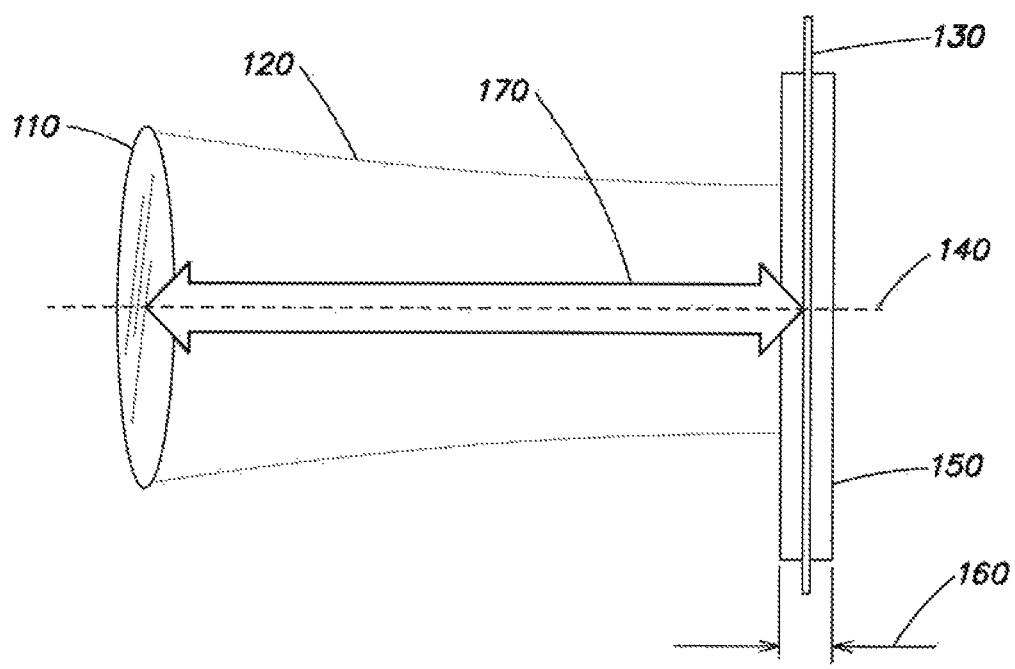
FIG. 1 is a diagram of one example of a conventional, retro-reflective imaging system.

Referring to FIG. 1, there is illustrated an example of a conventional imaging system. Fore-optics 110, such as one or more lenses, for example, focuses light 120 onto a focal plane array (or other imaging sensor) 130 that is positioned normal to the optical axis 140 (along which the light 120 travels). The image formed by this system is in focus over the entire image area (not shown) because the image volume 150, which corresponds to the depth of focus 160 of the system multiplied by the image area, overlaps the surface of the focal plane array 130, as shown in FIG. 1. However, with this type of conventional optical system, any incoming interrogation beam 170 is retro-reflected back along the optical axis 140. This retro-reflection makes the optical system easily detectable by optical augmentation systems, as discussed above.

Figure 2:
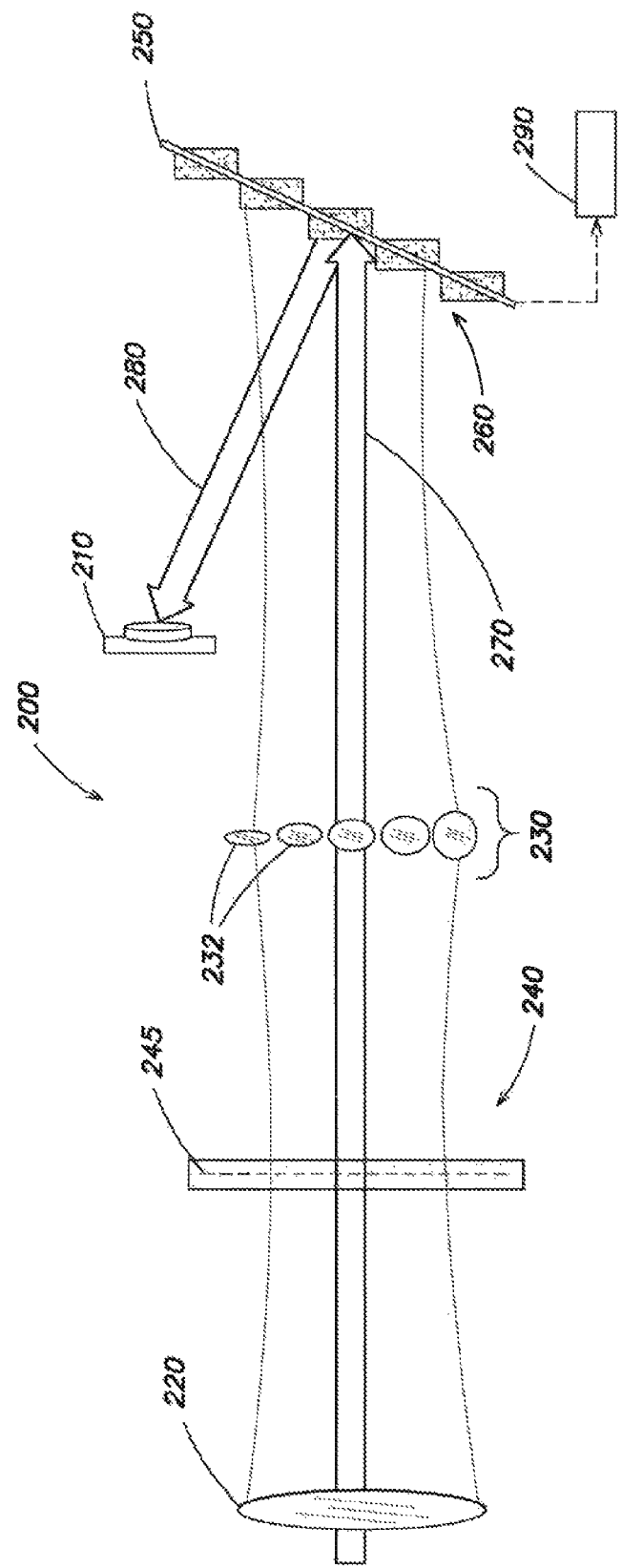
FIG. 2 is a diagram of one example of a non-retro-reflective optical imaging system configured to detect and analyze interrogation beams according to aspects of the invention.

According to one embodiment, retro-reflection may be avoided by tilting or rotating the focal plane array (or other imaging sensor) relative to the optical axis, and reconfiguring the optical system to implement sliced source imaging so as to maintain an in-focus image. FIG. 2 illustrates an example of a non-retro-reflective optical sensor system 200 according to one embodiment. The sensor system 200 further includes a threat detection sensor 210 for analyzing received interrogation beams, as discussed further below.

Referring to FIG. 2, fore-optics 220 directs incident electromagnetic radiation into the imaging system toward a relay optic 230. An image 240 of a distant object or scene is formed by the fore-optics 220 at a first image plane 245, and is reimaged by the relay optic 230 onto a tilted, or rotated, imaging detector 250 that is aligned and coincident with a second, tilted image plane. The imaging detector 250 may be a focal plane array (FPA), for example. The relay optic 230 is configured to slice the image volume into a plurality of slices 260 and reimage each slice individually onto the tilted imaging detector 250. As illustrated in FIG. 2, in one example, the relay optic 230 is configured to reimage each slice 260 at a slightly different focus position, such that the depth of focus of each slice overlaps the second image plane. In this manner, a substantially complete overlap may be achieved between the tilted imaging detector 250 and the reconstructed image volume comprised of the plurality of slices 260. Thus, substantially the entire image formed at the imaging detector 250 may be in focus. In addition, because the imaging detector 250 is tilted with respect to the optical axis of the system, reflections of incident electromagnetic radiation from the imaging detector 250 are off-axis. As a result, the optical sensor system 200 may achieve excellent image formation without retro-reflection.

The relay optic 230 may be implemented using an array of lenses and/or or mirrors. In one embodiment the relay optic 230 is segmented into elements 232 as shown in FIG. 2. In one example, each element 232 of the relay optic 230 has the same reflecting angle, but with a uniform progression of delay distances relative to one another such that the image slices have different optical path lengths, as illustrated in FIG. 2. However, in other examples the reflecting angles may be different. In one example, the relay optic 230 is a lenslet array comprised of a plurality of lenslets each having a different focal length. In this example, since each lenslet has a different focal length, each lenslet forms an image portion (corresponding to a slice 260) at a slightly different distance from the relay optic 230. The focal lengths of the lenslets may be selected such that the distances at which the image slices 260 are formed corresponds to the tilt of the second image plane, and the depth of focus of each slice overlaps the imaging detector 250, as illustrated in FIG. 2. In other examples, depending on the overall optical design, the focal length of the lenslets may be the same. Furthermore, in other examples, the relay optic 230 may be constructed using optical elements other than lenses, such as a faceted or stepped mirror, an array of mirrors, or a deformable mirror or mirror array, for example. The relay optic 230 may be implemented in numerous different ways and, regardless of physical implementation, functions to "slice" the source image and reimage each of the slices individually onto a rotated image plane such that a substantially in-focus reconstruction of the entire image is obtained, while substantially eliminating retro-reflection from the system.

Various embodiments, examples, and demonstrations of sliced source imaging systems and methods are discussed in commonly-owned, co-pending U.S. application Ser. No. 13/680,950 filed on Nov. 19, 2012 and titled "METHODS AND APPARATUS FOR IMAGING WITHOUT RETRO-REFLECTION," which is incorporated herein by reference in its entirety. Any of these embodiments or examples may be used to implement the optical sensor system 200.

Still referring to FIG. 2, as discussed above, in addition to performing one or more imaging functions using the imaging detector 250, the optical sensor system 200 may be configured to detect and analyze interrogation beams from optical augmentation devices, and thereby determine location and/or identification information about the optical augmentation device. An interrogating device (not shown) emits a bright light, a portion of which reaches the optical sensor system 200 and enters though an input aperture (e.g., via the fore-optics 220) as an interrogation beam 270. The interrogation beam 270 is incident on the imaging detector 250. However, since the imaging detector 250 is rotated (or tilted), rather than being retro-reflected back to the interrogating device, the interrogation beam is reflected at an angle. In one embodiment, the reflected interrogation beam 280 is directed to the threat detection sensor 210 where it may be analyzed to determine certain identification information about the interrogating device, as discussed further below.

The interrogation beam 270 also appears within the reconstructed image obtained by the imaging detector 250. As discussed above, the sliced source imaging technique employed by optical sensor system 200 creates an in-focus image on the rotated imaging detector 250. Accordingly, the position of the interrogation beam 270 within this image shows approximately from where, in the field of view of the optical sensor system 200, the interrogation beam is emanating from. Thus, at least an approximate location of the interrogating device may be derived. The imaging detector 250 may include, or may be coupled to, a processor 290 that processes the image obtained by the imaging detector 250 to determine the location of the interrogation beam 270 within the image, and therefore the approximate location of the source of the interrogation beam within the scene viewed by the imaging detector.

A single optical sensor system 200 may determine the approximate location of the interrogating device, with limited range information. The precision of the location information may be improved by collectively using two or more optical sensor systems. For example, where multiple sensor systems detect the interrogation beam 270, triangulation techniques may be used to more precisely determine the location of the interrogating device.

Figure 3:
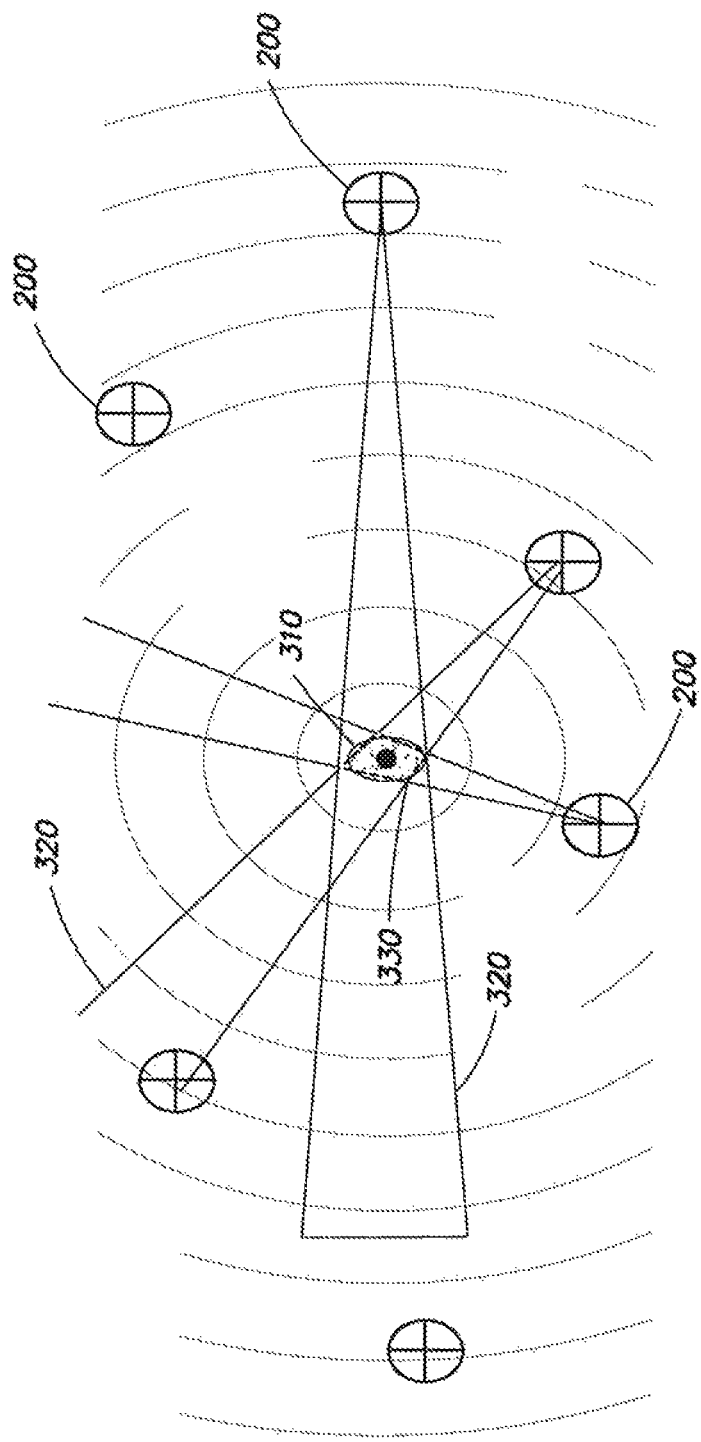
FIG. 3 is a diagram of one example of a system for threat location determination including a plurality of networked sensors according to aspects of the invention.

Referring to FIG. 3 there is illustrated a schematic representation of a network of sensor systems 200 which may be used to more accurately determine the location of an interrogating device 310. A plurality of sensor systems 200 may be deployed over a region to monitor the region for interrogating devices. Each sensor system 200 has a "threat location cone" 320, determined by a field of view of the sensor and the position of a received interrogation beam 270 within the image produced by the imaging detector 250. The threat location cone 320 defines an area from which the interrogation beam 270 may originate. Overlapping threat location cones 320 of different sensor systems 200 may pinpoint a probable location of the interrogating device 310, as illustrated in FIG. 3. To achieve more accurate location information about the interrogating device 310, two or more sensor systems 200 may be networked together to share the threat location information determined by each sensor. This sharing of information may allow region(s) of overlap 330 of the location cones 320 of each participating sensor system 200 to be established, to facilitate more accurate determination of the location of the interrogating device.

Any or all of the sensor systems 200 may receive and process location information determined by any of the sensor systems in the network. For example, the sensor systems may implement standard triangulation techniques based on approximate threat location information determined at each participating sensor system and shared over the network. Any or all of the sensor systems 200 may further be configured to receive and process image data from any other sensor systems in the network, as well as its own image data, and to determine likely regions of overlap 330, corresponding to likely positions of interrogating devices 310. In other examples, one or more sensors systems 200 in the network may be designated as "master" sensor systems configured to receive and process image data and/or threat location information received from other sensor systems in the network, as well as locally obtained image data and/or threat location information. In such a configuration, non-master sensor systems may be configured to send locally obtained image data and/or threat location information to the master sensor system(s) for processing. In other examples, the sensor systems 200 may be networked to a central processing device (not shown) which is configured to receive the image data, and optionally locally determined approximate threat location information, from each networked sensor system and to process the data/information to determine a probable location of the interrogating device. In such a configuration, the central processing device may or may not include any imaging capability, and may be located remote from the monitored region.

The sensor systems 200, and optionally the central processing device, may be networked together using any network configuration and protocol. For example, the sensor systems 200 may be hardwired together, or may be wirelessly connected to one another using any wireless transmission frequency band and protocol. Alternatively, the sensor systems 200 may be connected, in a wired or wireless manner, to the central processing device, and not necessarily to one another.

As discussed above, and referring again to FIG. 2, in addition to determining the location of the interrogating device based on the received interrogation beam 270, the reflected interrogation beam 280 may be analyzed by the threat detection sensor 210 to determine identifying information about the interrogating device 310. For example, the threat detection sensor 210 may analyze the reflected interrogation beam 280 to determine characteristics of the interrogation beam 270 such as its wavelength and/or modulation format. The modulation format used for and/or wavelength of the interrogation beam 270 may provide information about the type of interrogating device 310, which can also be used to categorize likely users of the interrogating device. For example, optical augmentation devices deployed on tanks may be different (i.e., have different modulation formats and/or use different wavelengths) from handheld optical augmentation devices which may be associated with rifles or other small arms. In addition, it may be known that certain types of optical augmentation devices used by certain forces have particular characteristics. Thus, the modulation format and/or wavelength of the interrogation beam 270 may reveal information, which together with known information about certain types of optical augmentation devices, may allow the likely type or "class" of the interrogating device 310, and its user, to be identified. It will be appreciated by those skilled in the art, given the benefit of this disclosure, that in other embodiments the threat detection sensor 210 is not limited to receiving the reflected interrogation beam 280 from the imaging detector 250, but may be arranged to receive the interrogation beam 270 directly or reflected from another component in the optical system.

As discussed above with reference to FIG. 3, multiple sensor systems 200 may be deployed throughout a region to be monitored. Since each sensor system 200 may be capable of identifying at least some characteristics of an interrogating device, by sharing information among a plurality of sensor systems, it may be possible to determine the type and location of more than one interrogating device within the monitored region. For example, the sensor systems may share determined identification information, as well as threat location information, such that regions of overlap of the threat location cones 320 (corresponding to likely positions of the interrogating devices) may be determined based on matching identification information. This approach may allow accurate determination of the locations of different types of interrogating devices within the monitored region.

Thus, according to various aspects and embodiments, one or more passive imaging sensor systems 200 may be used to covertly (without revealing their locations through retro-reflection) receive and analyze interrogation beams from optical augmentation, or other interrogating devices, to locate and identify these interrogating devices. Both the location and identification functions may be performed without retro-reflection, since normal incidence of the interrogation beam on the imaging detector 250 is not required, and without compromising any imaging functions of the sensor systems, since through the sliced source imaging techniques, an in-focus image may be maintained even though the imaging detector 250 is tilted with respect to the optical axis. These aspects allow the location and identification of interrogating devices to be performed on a continuous basis (without interrupting any imaging functions of the sensor systems) by single or multiple sensor systems in a completely passive and covert manner.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A non-retro-reflective optical threat detection system comprising:
    a structured relay optic configured to receive electromagnetic radiation representing a source image volume, the electromagnetic radiation including an interrogation beam, the structured relay optic further configured to slice the source image volume into a plurality of image slices and to reimage the plurality of image slices onto a tilted image plane that is tilted relative to an optical axis of the non-retro-reflective optical threat detection system;
    an imaging detector aligned with the tilted image plane and configured to reconstruct an image from the plurality of image slices, the image including an image of the interrogation beam, and to reflect the interrogation beam off-axis with respect to the optical axis of the non-retro-reflective optical threat detection system; and
    a processor coupled to the imaging detector and configured to process the image to determine an approximate location of a source of the interrogation beam within a field of view of the non-retro-reflective optical threat detection system.

2. The non-retro-reflective optical threat detection system of claim 1, wherein the structured relay optic is configured to spatially position the plurality of image slices such that a depth of focus of each image slice overlaps the tilted image plane.

3. The non-retro-reflective optical heat detection system of claim 1, wherein the imaging detector is a focal plane array.

4. The non-retro-reflective optical threat detection system of claim 1, further comprising:
    a threat detection sensor positioned off-axis with respect to the optical axis of the non-retro-reflective optical threat detection system and configured to receive and analyte the interrogation beam.

5. The non-retro-reflective optical threat detection system of claim 4, wherein the threat detection sensor is configured to determine a modulation format of the interrogation beam.

6. The non-retro-reflective optical threat detection system of claim 5, wherein the threat detection sensor is configured to provide identifying information corresponding to the source of the interrogation beam based on the modulation format of the interrogation beam.

7. The non-retro-reflective optical threat detection system of claim 6, wherein the threat detection sensor is further configured to determine a wavelength of the interrogation beam.

8. The non-retro-reflective optical threat detection system of claim 7, wherein the threat detection sensor is configured to provide the identifying information based on the modulation format and the wavelength of the interrogation beam.

9. The non-retro-reflective optical threat detection system of claim 4, wherein the threat detection sensor is configured to determine a wavelength of the interrogation beam.

10. The non-retro-reflective optical threat detection system of claim 4, wherein the threat detection sensor is configured to receive the interrogation beam reflected by the imaging detector.

11. An optical threat detection system comprising:
a plurality of optical sensors each including:
a structured relay optic configured to receive electromagnetic radiation representing a source image volume, the electromagnetic radiation including an interrogation beam, the structured relay optic further configured to slice the source image volume into a plurality of image slices and to reimage the plurality of image slices onto a tilted image plane that is tilted relative to an optical axis of the optical sensor;
an imaging detector aligned with the tilted Image plane and configured to reconstruct an image from the plurality of image slices, the image including an image of the interrogation beam, and to reflect the interrogation beam off-axis with respect to the optical axis of the optical sensor system; and
a processor configured to process the image to determine approximate location information about a source of the interrogation beam;
wherein the processor of at least one of the plurality of optical sensors is configured to receive the approximate location information from others of the plurality of optical sensors and to determine a location of the source based on combined analysis of the approximate location information from the plurality of optical sensors.

12. The optical threat detection system of claim 11, wherein the plurality of optical sensors are communicatively coupled together to form a network of sensors.

13. The optical threat detection system of claim 12, wherein each of the plurality of optical sensors further includes a threat detection sensor positioned off-axis with respect to the optical axis of the optical sensor and configured to receive and analyze the interrogation beam reflected from the imaging detector to determine identification information about the source.

14. The optical threat detection system of claim 13, wherein the threat detection sensor is configured to determine at least one of a wavelength and a modulation format of the interrogation beam.

15. A method of covert detection of an interrogating device comprising:
receiving an interrogation beam at an optical system;
imaging a scene including a source of the interrogation beam without retro-reflecting the interrogation beam to produce an image, including:
segmenting a source image volume of the scene into a plurality of image slices, each image slice having an image volume;
individually reimaging the plurality of image slices onto a tilted image plane tilted with respect to an optical axis of the optical system such that the image volume of each image slice overlaps the tilted image plane; and
reconstructing a substantially in-focus image at the tilted image plane from the plurality of image slices; and
analyzing the image to determine an approximate location of the source within the scene.

16. The method of claim 15, further comprising:
reflecting the interrogation beam off-axis to a threat detection sensor; and
analyzing the reflected interrogation beam at the threat detection sensor to determine identification information about the source.

17. The method of claim 16, wherein analyzing the reflected interrogation beam includes determining at least one of a wavelength and a modulation format of the interrogation beam.

18. The method of claim 15, further comprising sharing the approximate location information among a plurality of optical systems.

19. They method of claim 18, further comprising collectively processing the approximate location information from the plurality of optical systems to obtain the location of the source of the interrogation beam.

* * * * *

UNITED STATES PATENT AND TRADEMARK OFFICE
CERTIFICATE OF CORRECTION

| | | |
|---|---|---|
| PATENT NO. | : 9,018,575 B2 | Page 1 of 1 |
| APPLICATION NO. | : 13/714637 | |
| DATED | : April 28, 2015 | |
| INVENTOR(S) | : Andrew Kowalevicz et al. | |

It is certified that error appears in the above-identified patent and that said Letters Patent is hereby corrected as shown below:

In the Specification:

At column 5, line 8, delete "minor" and replace with --mirror--.

At column 5, line 28, delete "minor" and replace with --mirror--.

In the Claims:

At column 8, line 46, claim number 3, delete "heat" and replace with --threat--.

At column 8, line 52, claim number 4, delete "analyte" and replace with --analyze--.

At column 10, line 38, claim number 19, delete "They" and replace with --The--.

Signed and Sealed this
First Day of September, 2015

Michelle K. Lee
*Director of the United States Patent and Trademark Office*